United States Patent
Watanabe et al.

(10) Patent No.: US 7,114,081 B2
(45) Date of Patent: Sep. 26, 2006

(54) OUTSIDE LEAKAGE PREVENTING SYSTEM OF CONFIDENTIAL INFORMATION

(75) Inventors: Kiyoshi Watanabe, Tokyo (JP); Kouzo Iwami, Tokyo (JP); Masayuki Miura, Tokyo (JP)

(73) Assignee: Graphin Co., Ltd., Tokyo (JP)

( * ) Notice: Subject to any disclaimer, the term of this patent is extended or adjusted under 35 U.S.C. 154(b) by 812 days.

(21) Appl. No.: 10/230,286

(22) Filed: Aug. 29, 2002

(65) Prior Publication Data

US 2003/0065937 A1   Apr. 3, 2003

(30) Foreign Application Priority Data

Oct. 3, 2001   (JP) ............... 2001-307718

(51) Int. Cl.
| | |
|---|---|
| G06F 11/30 | (2006.01) |
| H04L 9/32 | (2006.01) |
| G06F 15/16 | (2006.01) |
| G06F 15/173 | (2006.01) |

(52) U.S. Cl. .............. 713/189; 726/5; 726/7; 709/204; 709/223

(58) Field of Classification Search ............ None
See application file for complete search history.

(56) References Cited

U.S. PATENT DOCUMENTS

| | | | | | |
|---|---|---|---|---|---|
| 5,199,068 | A | * | 3/1993 | Cox ............... | 713/182 |
| 5,727,950 | A | * | 3/1998 | Cook et al. ........ | 434/350 |
| 5,787,175 | A | * | 7/1998 | Carter ............. | 713/165 |
| 6,105,131 | A | * | 8/2000 | Carroll ............ | 713/155 |
| 6,438,690 | B1 | * | 8/2002 | Patel et al. ........ | 713/156 |
| 6,785,810 | B1 | * | 8/2004 | Lirov et al. ........ | 713/165 |
| 6,928,547 | B1 | * | 8/2005 | Brown et al. ....... | 713/186 |
| 6,978,376 | B1 | * | 12/2005 | Giroux et al. ...... | 713/189 |
| 2002/0055968 | A1 | * | 5/2002 | Wishoff et al. ..... | 709/203 |
| 2002/0059369 | A1 | * | 5/2002 | Kern et al. ........ | 709/203 |
| 2003/0041147 | A1 | * | 2/2003 | van den Oord et al. | 709/227 |

* cited by examiner

*Primary Examiner*—Gilberto Barrón, Jr.
*Assistant Examiner*—Virgil Herring
(74) *Attorney, Agent, or Firm*—Manabu Kanesaka (57) ABSTRACT

A leakage preventing system of confidential information, for example, for CBT (Computer Based Training), prevents leakage of highly confidential education and training information. The system includes a manager terminal unit having an authentication server, an educator/trainer terminal unit for holding confidential information for CBT in the encrypted form and operated by a specific user, and a communication network for exchanging from time to time data between these terminal units. Authentication is given to the educator/trainer terminal unit only when an authentication request from the educator/trainer terminal unit satisfies predetermined authentication granting requirements, and a prescribed limited using time is set so as to make it possible to peruse the confidential information decoded in the educator/trainer terminal unit, only within the limited time.

4 Claims, 9 Drawing Sheets

| CBT 90 min |
|---|
| CBT BROWSE TIMER |
| BALANCE OF CBT BROWSABLE TIME IS xx MINUTES |
| WHEN BROWSING OVER THIS TIME LIMIT, YOU HAVE TO OBTAIN ANOTHER AUTHENTICATION |
| WHEN CONTINUING DISPLAY OF A PAGE CONTINUOUSLY FOR xx MINUTES, YOU HAVE TO OBTAIN ANOTHER AUTHENTICATION |

OUTSIDE LEAKAGE PREVENTING SYSTEM OF CONFIDENTIAL INFORMATION

TECHNICAL FIELD

The present invention relates to a leakage preventing technique of confidential information stored in a communication network terminal unit. More particularly, the invention relates to a leakage preventing system to outside of confidential information useful when providing the confidential information for computer based education and training to a specific user who is a person receiving education and training.

BACKGROUND ART

Along with the recent wide popularization of personal computers and Internet, computer based remote educating techniques known as e-learning and WRT (Web Based Training) are rapidly diffusing.

The above-mentioned remote educating techniques generally adopt a system which provides education information only to specific users who satisfy prescribed requirements for being educated and trained, and various security measures are taken to prevent persons concerned including the aforementioned users from recklessly accessing the education information.

The security measures are taken in such a case from the point of view of preventing hackers to make an illegal access or leakage of information and keeping stability of systems. More specifically, it is the general practice to take measures by appropriately adopting encryption technology or authentication technology.

However, leakage of information is not limited to illegal accesses, but an internal party (on user's side) may leak the information. Particularly, when the terminal unit is a portable personal computer such as a laptop type or a notebook-sized computer, the terminal unit itself may be easily carried out.

On the assumption that education information provided to a user terminal unit by using a remote education technique has highly confidential contents to outsiders, therefore, takeout of the terminal unit by the user may result in outside leakage of the confidential information, and no particular counter-measure is taken against this inconvenience.

SUMMARY OF THE INVENTION

The present invention was developed in view of the aforementioned problems encountered in the conventional techniques, and has an object to provide a leakage preventing technique of confidential information, which prevents the user from carrying out and leaking highly confidential education/training information.

To achieve the above-mentioned object, the present invention has several features. A first aspect of the invention provides a user terminal unit connected to a host computer via a prescribed communication network, wherein, on condition that there is available an encrypted data file storing confidential information encrypted by encrypting means, and that authentication is given by the host computer as satisfying predetermined authenticating requirements, it is made possible to peruse the confidential information in the encrypted data file by means of a prescribed browser through decoding within a prescribed limited perusal time set by the host computer.

The above-mentioned first aspect of the invention is applicable also to other uses as the remote education technique through communication, whereas the following second to fourth aspects of the invention were developed to cover specifically the remote education technique through communication.

The second aspect of the invention provides an educator/trainer terminal unit connected to a manager terminal unit via a prescribed communication network, wherein, on condition that there is available an encrypted data file storing computer based confidential information for education and training encrypted by encrypting means, and that authentication is given by the manager terminal unit as satisfying predetermined authenticating requirements, it is made possible to peruse the confidential information in the encrypted data file by means of a prescribed browser through decoding within a prescribed limited perusal time set by the manager terminal unit.

The third aspect of the invention provides a leakage preventing system preventing leakage to outside of computer based confidential information for education and training, comprising a manager terminal unit having an authentication server under control of a manager; an educator/trainer terminal unit, having an encrypted data file which stores computer based confidential information for education and training encrypted by encrypting means, operated by a specific user registered in the manager terminal unit; and a communication network mutually connecting the individual terminal units from time to time for transmission and receiving of data; wherein the manager terminal unit gives authentication to the educator/trainer terminal unit and sets a limited perusal time for limiting the perusal time by the user thereto; and wherein the educator/trainer terminal unit on condition of authentication by the manager terminal unit, decodes the confidential information in the encrypted data file and makes it possible to peruse the confidential data by a prescribed browser only during the limited perusal time.

The fourth aspect of the invention provides a method for preventing leakage to outside of computer based confidential information encrypted by encrypting means, comprising a step of installing the confidential information in an encrypted data file of an educator/trainer terminal unit used by a specific user; a step of user's sending an authentication request from the educator/trainer terminal unit via a prescribed communication network to a manager terminal unit managed by a manager; a step of granting authentication to the educator/trainer terminal unit, and setting a limited perusal time for limiting the perusal time of the user; and a step of making it possible to peruse the information by a prescribed browser only within the limited perusal time by decoding the confidential information in the encrypted data file on the educator/trainer terminal unit side.

In both the third and the fourth aspects of the invention, the limited perusal time set by the manager terminal unit in the educator/trainer terminal unit should preferably be within the lapse of a prescribed time relative to the date and time of startup of the browser and/or within a prescribed non-operating time after the startup of the browser.

DETAILED DESCRIPTION

Preferred embodiments of the present invention will now be described. While this embodiment is a case of application to the remote education technique by communication, the present invention is applicable also in areas other than the remote education technique.

Figure 1:
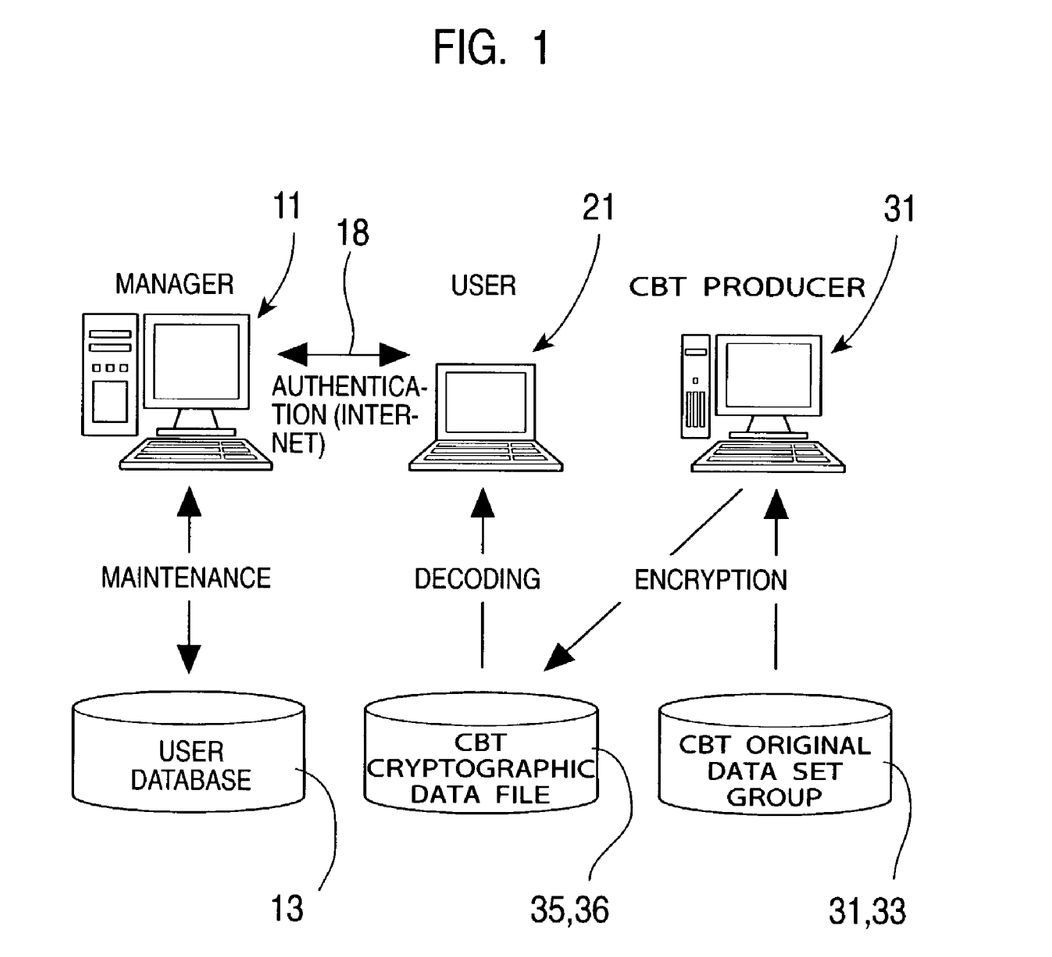
FIG. 1 is a schematic view illustrating an outline of the entire system of the present invention.
Figure 6:
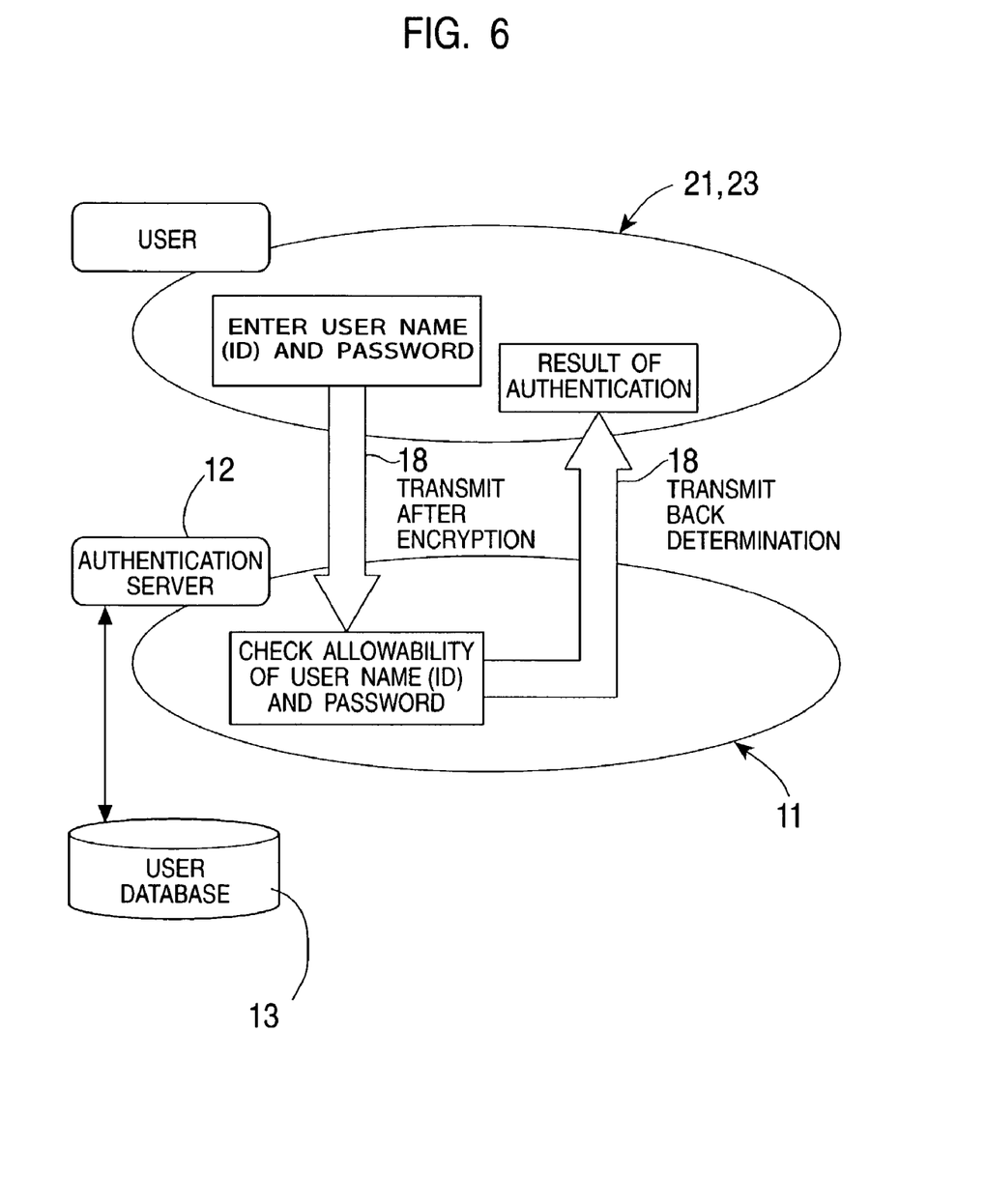
FIG. 6 is a descriptive view illustrating the response relationship between authentication request and granting thereof accomplished between the user and the manager.

Referring to FIGS. 1 and 6, the system of the invention comprises a manager terminal unit 11 having an authentication server 12, under the control of a manager; an educator/trainer terminal unit 21 used by specific users; and a producer terminal unit 31 for a producer producing confidential information for computer based education and training.

These terminal units 11, 21 and 31 may be personal computers. Specific users are previously registered in the manager terminal unit 11. At least the manager terminal unit 11 and the educator/trainer terminal unit 21 are mutually connected so as to permit exchange data via a communication network 18 such as the Internet. In the following description, the "Computer Based Training" is abbreviated as "CBT".

The above-mentioned producer terminal unit 31 is used when producing original confidential information for CBT in response to a request from the manager. The produced confidential information is encrypted and installed in the educator/trainer terminal unit 21.

Encryption of the confidential information is taken charge of by any of the producer and the manager. Encryption will be described in a case where the producer takes charge of encryption, with response to FIGS. 2 and 3.

Figure 2:
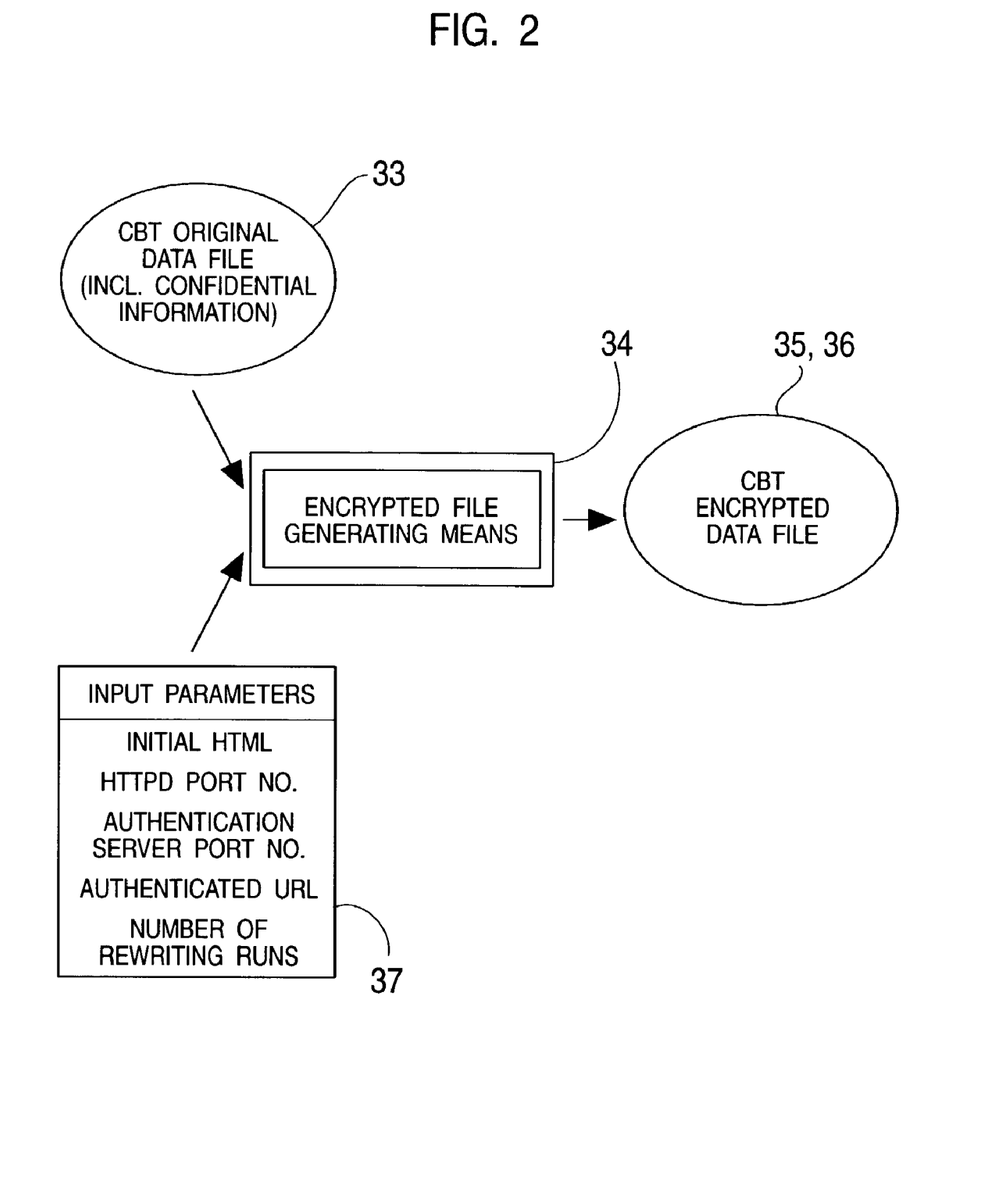
FIG. 2 is a descriptive view schematically illustrating the encryption of confidential information which is one of the important components of the invention.

The producer terminal unit 31 has an original data file 33. A CBT original data set group 32 containing confidential information previously produced by the producer in this original data file 33, and a file currently necessary is selected from the CBT original data set group. This file is converted into a CBT encrypted data file 35 by encrypted file generating means 34 comprising a personal computer for encryption.

Figure 3:
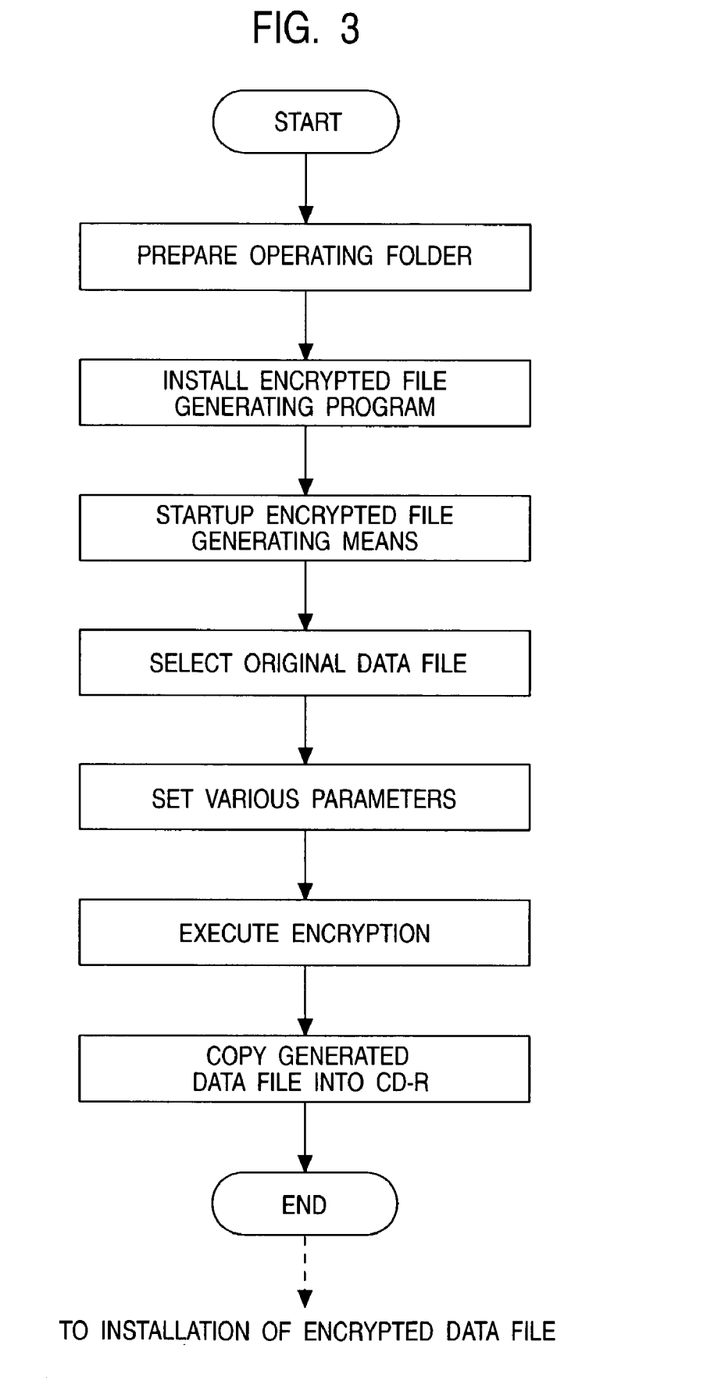
FIG. 3 is a flowchart illustrating the encrypting procedure executed by the encrypted file generating means.

FIG. 3 is a flowchart illustrating a typical procedure for encryption carried out via the encrypted file generating means 34 in the course of this conversion. According to the flowchart shown in FIG. 3, an operating folder is first prepared for encryption within the encrypted file generating means 34, and then, an encrypted file generating program is installed in the operating folder.

On the other hand, the CBT original data file selected for encrypting for the current processing from the CBT original data set group 32 is provided in a state stored for example in a CD (Compact Disk), and this file is drag-and-dropped into an encrypting window displayed upon startup of the encrypted file generating program.

Thereafter, a destination of the CBT encrypted data file 35 and authentication-server-related parameters are set and an initial display file is designated by use of input parameters 37 having contents shown in FIG. 2. Then, encryption is started by clicking the execution button of encryption.

The CBT encrypted data file 35 (including the confidential information) thus generated through encryption is stored in an external storage medium 36 such as a CD-R so as to permit installation in the educator/trainer terminal unit 21 of the user, thus completing all the encryption steps carried out on the producer side.

The external storage medium 36 stores a set of data regarding the confidential information required upon user's perusal with the browser 23, and encrypted input parameters, a public key and a secret key are encrypted and stored.

Figure 4:
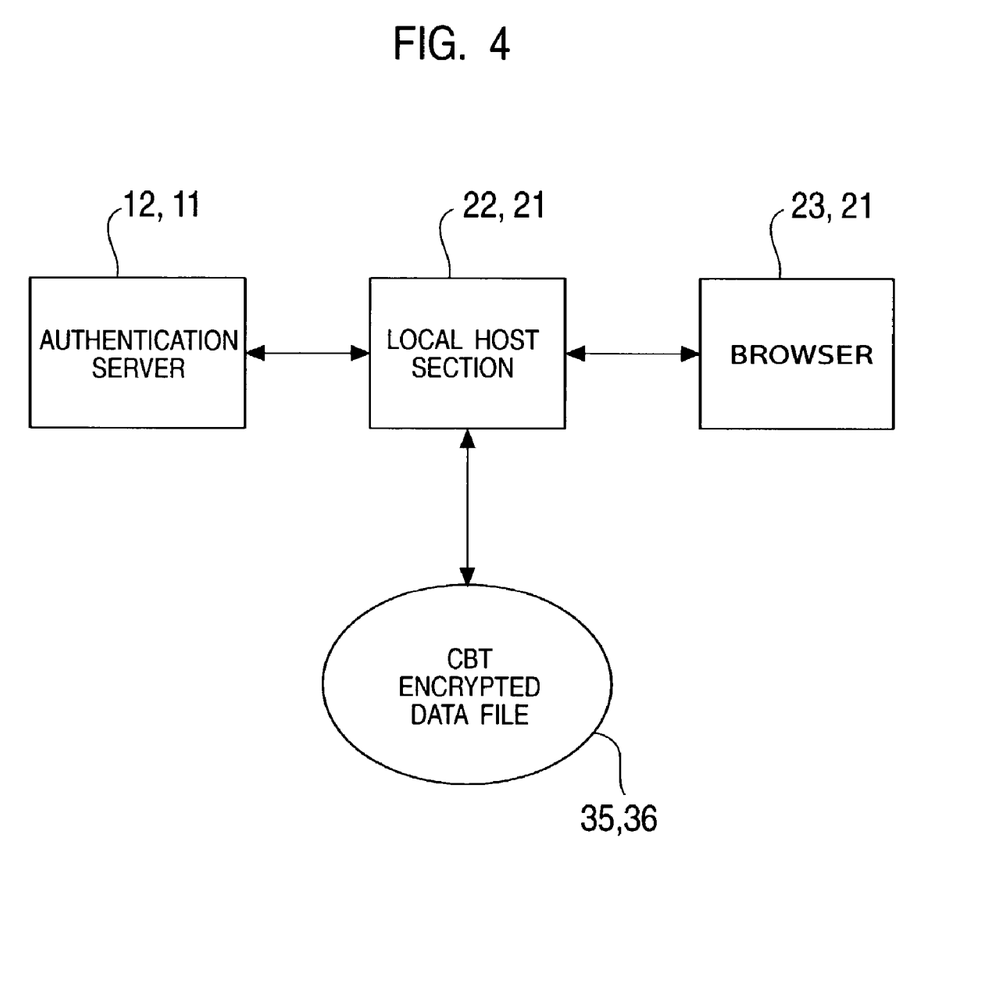
FIG. 4 is a descriptive view illustrating an outline of the decoding step of the encrypted confidential information.

The educator/trainer terminal unit 21 holds the CBT encrypted data file (including the confidential information) 35 installed via the above-mentioned storage medium 36 as shown in FIG. 4.

Figure 5:
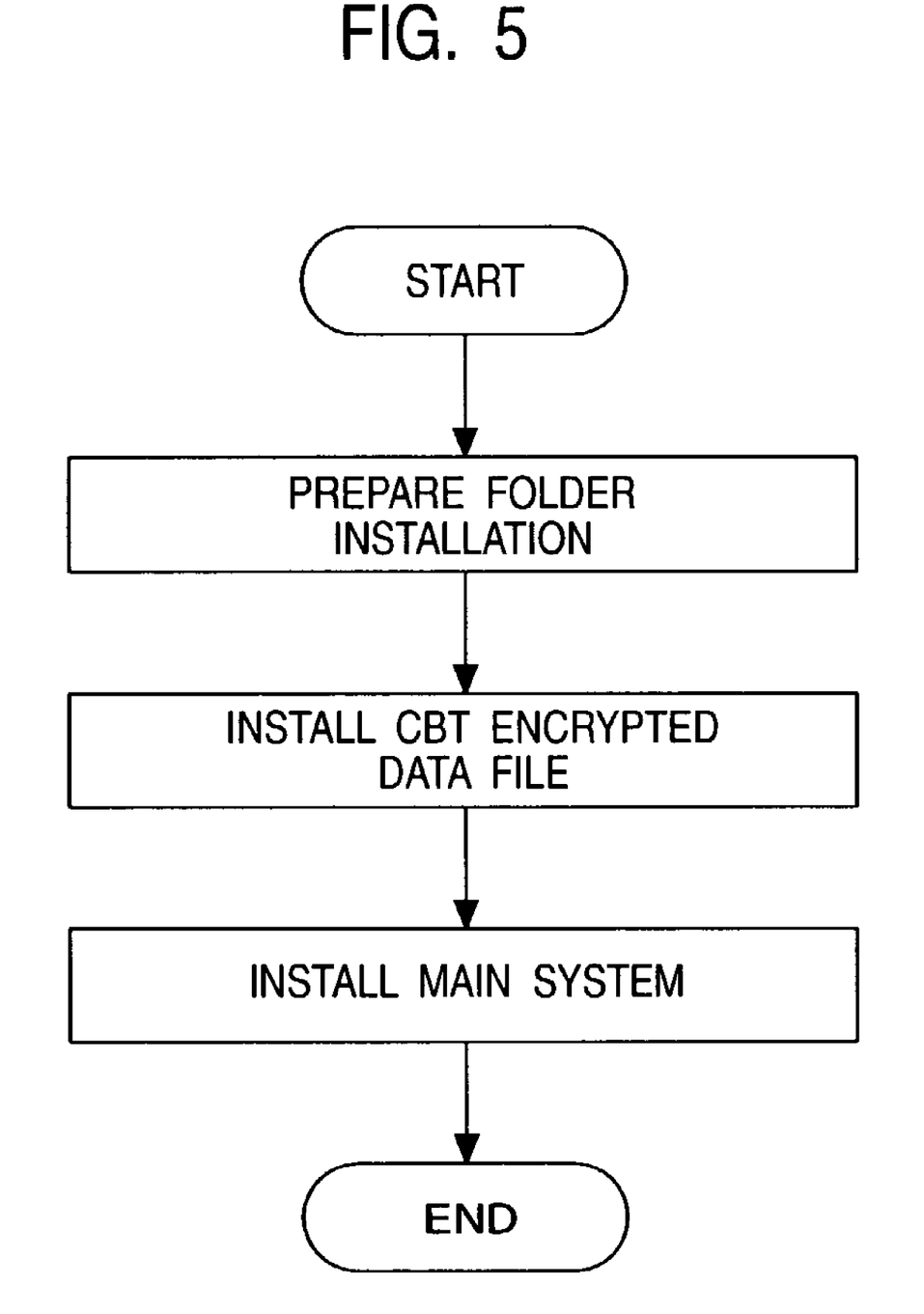
FIG. 5 is a flowchart illustrating the installing procedure of the CBT encrypted data file in the educator/trainer terminal unit.

FIG. 5 is a flowchart illustrating a typical procedure for installation of the CBT encrypted data file 35 in the educator/trainer terminal unit 21 performed at this point in time.

According to the flowchart shown in FIG. 5, a folder for installation is first prepared in the educator/trainer unit 21, and then, a main system (local host section 22) is installed therein. Then, the CBT encrypted data file 35 stored in the external storage medium 36, into the above-mentioned folder, thus completing the steps of processing.

On condition that authentication is granted by the authentication server 12 of the manager terminal unit 11, the educator/trainer terminal unit 21 decodes the encrypted confidential information and makes it possible to peruse the confidential information by means of a prescribed browser 23 only during a prescribed limited perusal time set by the manager terminal unit 11.

The educator/trainer terminal unit 21 has, for example, a special HTTPD (Hyper Text Transfer Protocol Daemon), and can request authentication in an appropriate manner of cryptography such as MD5 via a communication network 18 to the authentication server 12.

On the other hand, the authentication server 12 of the manager terminal unit 11 has a user database 13. User names (ID) and passwords of all the users selected by the manager as needing to attend education and training are registered always in a maintained and highly updated state in the user database 13.

Referring to FIG. 6, when a user enters the user name (ID) assigned and the password into the educator/trainer terminal unit 21, the entered ID and password are encrypted and transmitted to the manager terminal unit 11.

Upon receipt thereof, the authentication server 12 of the manager terminal unit 11 retrieves the user database 13 to determine suitability and sends the result back to the educator/trainer terminal unit 21. Each user can peruse data by use of a prescribed browser 23.

Dates of access and user names (ID) of the users having requested authentication are stored as recorded data in the manager terminal unit 11, thus making it possible for the manager to confirm the status of use thereof after the fact.

Figure 7:
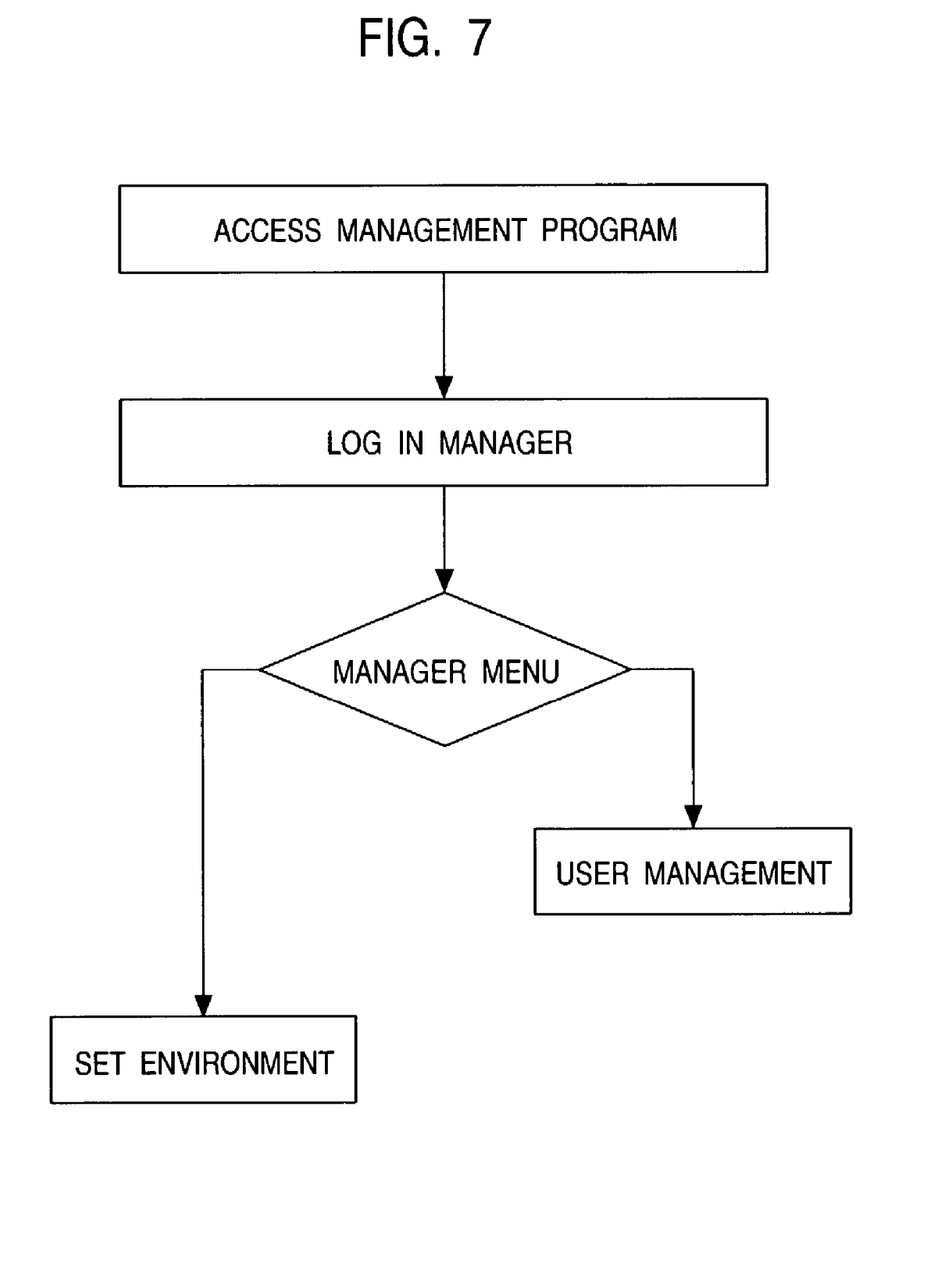
FIG. 7 is a flowchart illustrating the operating procedure by the manager applied to the authentication server.

For the purpose of granting authentication to a user wishing to peruse the CBT encrypted data file 35, the manager operates the authentication server 12 in accordance with the procedure shown in FIG. 7.

After starting up a control program by accessing the authentication server 12 from the manager terminal unit 11, the manager enters his or her own password to log in. Then, a manager menu comprising user management and environmental setting is displayed.

At this point in time, any of "New User Registration", "User Information Change", and "User deletion" can be executed in a menu of user management. In the environment setting menu, any of "Non-Operating Time", "Time Lapse" and "Manager Password" can be arbitrarily changed.

When a case is determined by the authentication server 12 as satisfying the authentication granting requirements, authentication is granted to the appropriate educator/trainer terminal unit 21 via the communication network 18. As a result, in the educator/trainer terminal unit 21, the encrypted confidential information is automatically decoded, and it is made possible to peruse the confidential information by use of a prescribed browser 23.

In addition, along with granting of the authentication by the authentication server 12, a limited perusal time is set for the educator/trainer terminal unit 21. The user can therefore use the confidential information only within a limited perusal time set anew.

The limited perusal time in this case should preferably be set by a combination of monitoring based on the time lapse and monitoring based on non-operating time in such a manner that timeout is reached at the moment when any of the both conditions is satisfied, requiring re-authentication.

In the monitoring based on the time lapse, the lapse of time from granting of the first authentication to the educator/trainer terminal unit 21 to the moment when an authentication request becomes necessary again is determined to be "90 minutes", for example, with reference to the startup time of the browser 23 is set from the manager terminal unit 11.

Figure 8:
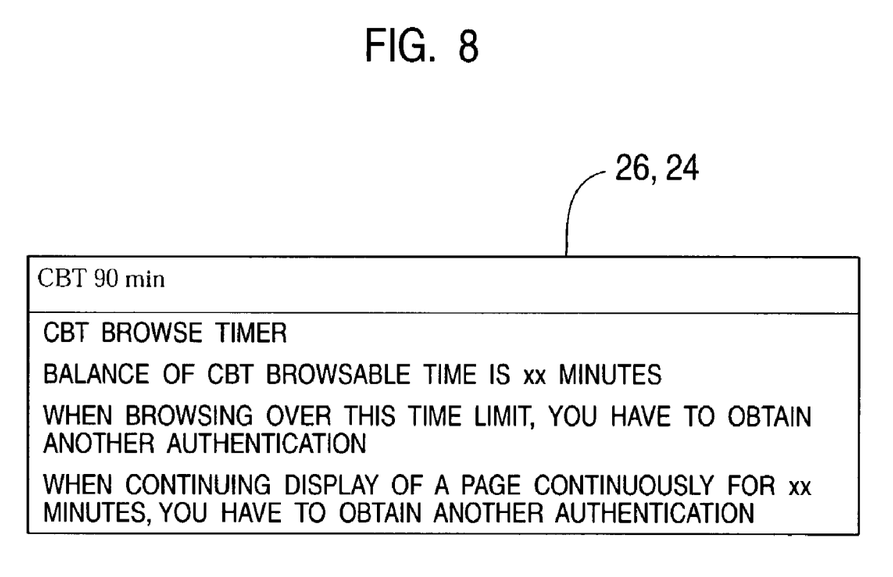
FIG. 8 is a display screen illustrating a typical limited perusal time displayed on the educator/trainer terminal unit.

Upon startup of the browser 23, a subtraction timer is displayed on the timer monitoring window. By clicking this subtraction timer display section, a window 26 is opened in the subtraction timer display screen 24, as shown in FIG. 8, where necessary information including a balance of time permitting perusal is displayed. This enables the user to know an accurate remaining time.

In the example shown above, lapse of 90 minutes results in timeout, and it is necessary for the educator/trainer terminal unit 21 to request another authentication. Therefore, even if the user carries out the terminal unit itself while the educator/trainer terminal unit 21 is in the standby state, the confidential information cannot be perused outside.

The monitoring based on the non-operating time imposes a time limit on the educator/trainer terminal unit 21 when, after startup of the browser 23, perusal state is continued without operation of the input operating section such as a mouse or a keyboard. The manager terminal unit 11 sets a maximum non-operating time of, for example, "three minutes".

More specifically, when no input operation is made during three minutes, the user is deemed to have left the educator/trainer terminal unit 21, resulting in timeout. Re-authentication is required for perusing the information again.

Figure 9:
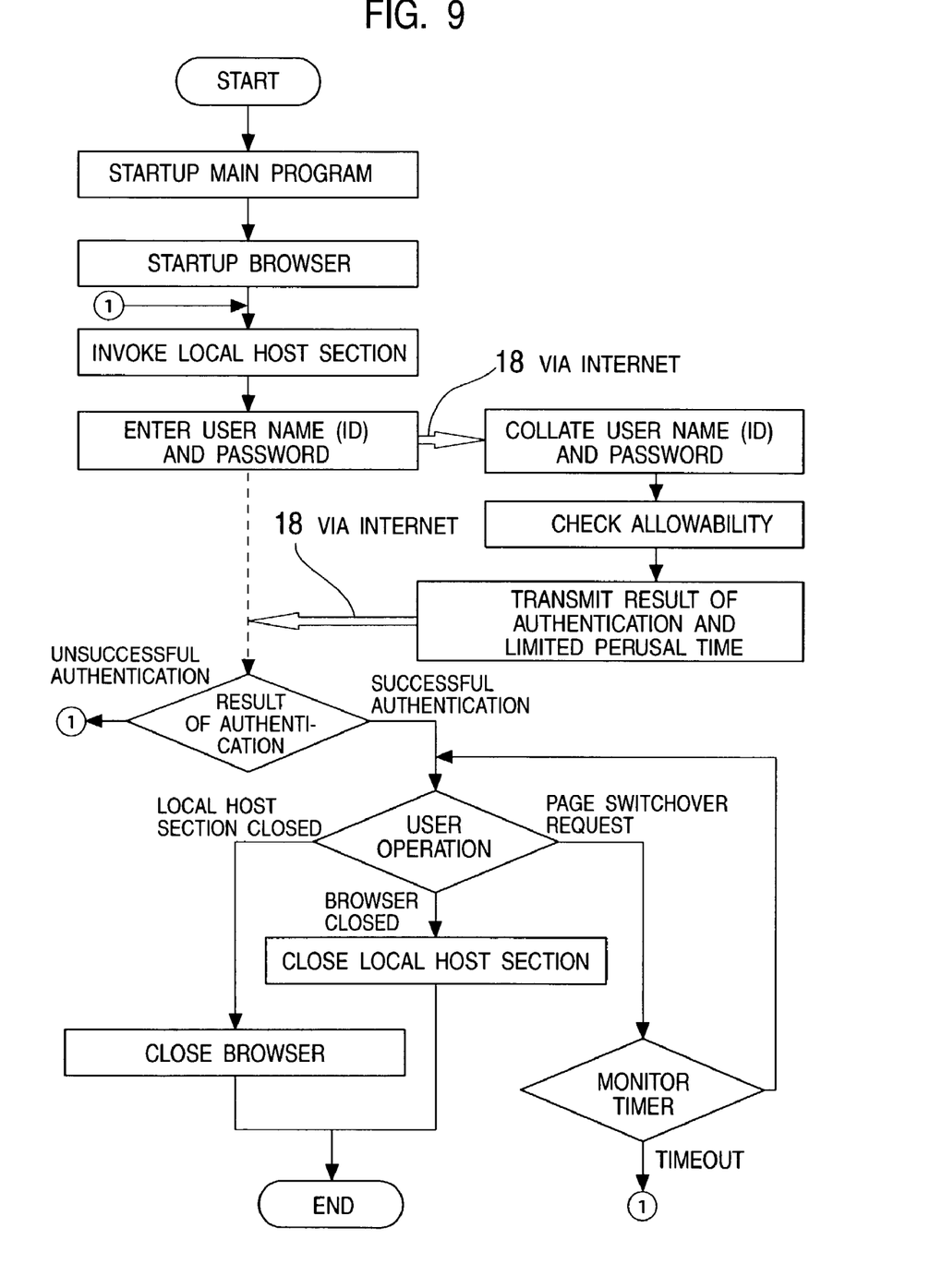
FIG. 9 is a flowchart illustrating the processing procedure for the entire system of the invention.

The processing procedure of the entire system of the present invention will now be described with reference to the flowchart shown in FIG. 9. After starting up the main program of the educator/trainer terminal unit 21, the browser 23 is started. Then, a local host section 22 is invoked, and a user name (ID) and a password entered by the user are transmitted to the authentication server 12 of the manager terminal unit 11 via the communication network 18.

The authentication server 12 determines whether or not authentication is to be granted by collating the user name (ID) and the password with those registered in the user database 13. Except when authentication is not given to permit perusal, the authentication server 12 transmits the result of authentication giving permission and a limited perusal time to the educator/trainer terminal unit 21 via the communication network 18.

As a result, the educator/trainer terminal unit 21 allows perusal of the confidential information only within the limited perusal time. When timeout is reached by the elapse of the limited perusal time, another authentication should be requested to the authentication server 12.

When the user finishes perusal of the confidential information within the limited perusal time, the local host 22 is closed after closing the browser 23, or the browser 23 is closed after closing the local host 22, thereby completing perusal of the confidential information by the user.

According to the present invention, as described above, confidential information having appropriate contents regarding education and training is stored in an encrypted state in the educator/trainer terminal unit 21, and decoding thereof is impossible unless authentication is granted from the authentication server 12 of the manager terminal unit 11. Therefore, a person other than a registered user cannot peruse the confidential information, thus permitting certain prevention of leakage outside of the confidential information.

Even when granted authentication, the user can peruse the confidential information only during a limited perusal time. This ensures prevention of leakage of the secret.

In addition, by setting a limited perusal time by means of a combination of the prescribed time lapse based on the startup date of the browser and a prescribed non-operating time after startup of the browser, satisfaction of any of these conditions leads to timeout, making it impossible to peruse. Even when the educator/trainer terminal unit itself in the standby state is carried out, therefore, the confidential information cannot be perused, thus permitting certain prevention of leakage outside of the information.

The present invention is not limited to the aforementioned embodiment. For example, a limited perusal time may be set by adopting any of the monitoring based on the lapse of time and the monitoring based on the non-operating time as required. Confidential information may have appropriately selected contents so far as it is used for any of various education and training projects.

Encryption of confidential information may be accomplished on the manager side, not on the producer side, or may be conducted through cooperation of the producer and the manager. Encryption may be performed by adopting any of the publicly known encrypting methods.

The invention claimed is:

1. A leakage preventing system for preventing leakage, to outside, of computer based confidential information for education and training, comprising:
   a manager terminal unit having an authentication server under control of a manager;
   an educator/trainer terminal unit, having an encrypted data file which stores computer based confidential information for education and training encrypted by encrypting means, operated by a specific user registered in said manager terminal unit; and
   a communication network mutually connecting said individual terminal units from time to time for transmission and receiving data; wherein said manager terminal unit gives authentication to said educator/trainer terminal unit and sets a limited perusal time for limiting the perusal time by said user;

said educator/trainer terminal unit on condition of authentication by said manager terminal unit, decodes said confidential information in said encrypted data file and makes it possible to peruse said confidential data by a prescribed browser only within said limited perusal time; and said limited perusal time set by said manager terminal unit in said educator/trainer terminal unit is at least one of lapse of prescribed time relative to date and time of startup of said browser and lapse of non-operating time set beforehand after the startup of said browser.

2. A leakage preventing system according to claim 1, wherein said limited perusal time is said lapse of non-operating time by the user.

3. A method for preventing leakage, to outside, of computer based confidential information encrypted by encrypting means, comprising:

a step of installing said confidential information in an encrypted data file of an educator/trainer terminal unit used by a specific user;

a step of sending an authentication request from said educator/trainer terminal unit via a prescribed communication network to a manager terminal unit managed by a manager;

a step of granting authentication to said educator/trainer terminal unit, and setting a limited perusal time for limiting the perusal time of said user; and a step of making it possible to peruse said information by a prescribed browser only within said limited perusal time by decoding said confidential information in said encrypted data file on said educator/trainer terminal unit, wherein said limited perusal time set by said manager terminal unit in said educator/trainer terminal unit is at least one of lapse of prescribed time relative to date and time of startup of said browser and lapse of non-operating time set beforehand after the startup of said browser.

4. A method for preventing leakage according to claim 3, wherein said limited perusal time is said lapse of non-operating time by the user.

* * * * *